Patented Oct. 23, 1945

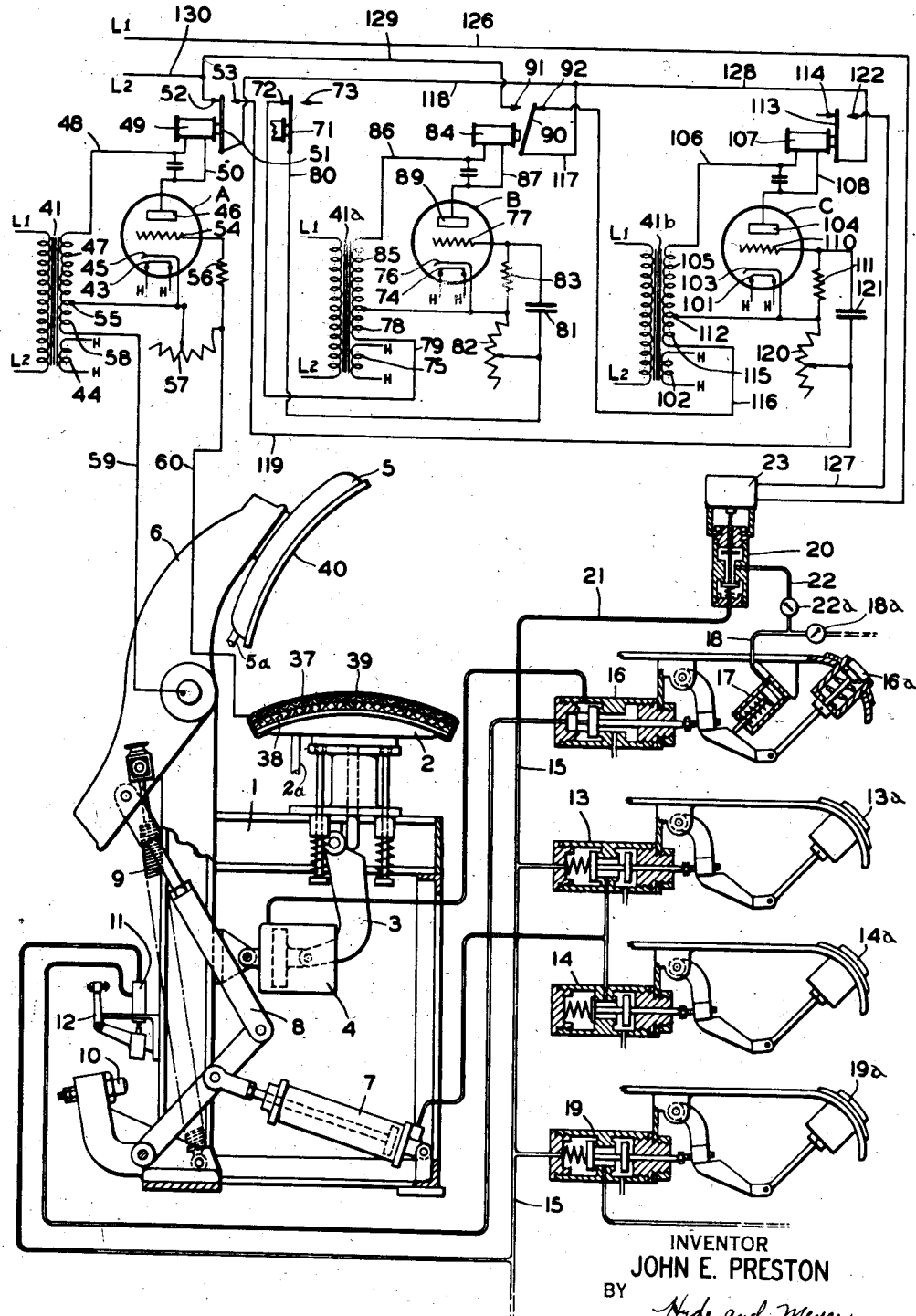

2,387,293

UNITED STATES PATENT OFFICE 2,387,293

ELECTRONIC CONTROL FOR IRONING OR DRYING MACHINERY

John E. Preston, Cincinnati, Ohio, assignor to The American Laundry Machinery Company, Norwood, Cincinnati, Ohio, a corporation of Ohio Application March 20, 1941, Serial No. 384,385

3 Claims. (Cl. 38—25)

This invention relates to control means for ironing, pressing, or drying machinery such as is used in commercial laundries, and is in the nature of a modification of the invention shown and described in my copending application, Serial No. 384,384, filed of even date herewith, to which reference may be had, if desirable or necessary.

The present invention relates specifically to control means sensitive to the moisture content of the work, and which is capable of terminating the drying, ironing, or pressing operation when the moisture is reduced to a desired point, usually by opening the cooperating relatively movable pressing members, said means being utilized in operative combination with an additional control unit which functions as a maximum time control, or safety control, by imposing a fixed time limit to the actual duration of the pressing operation. It may be that in some instances the operation may be terminated before actual completion, while in other instances the anticipated completion time may be exceeded because the moisture control unit has failed to function. This maximum time control, while intended primarily as a timing means to control operation of a machine to conform to a production schedule, may also serve as a safety factor to protect the work and the press elements.

It is well known to those skilled in the laundering art that there may be a material variation in the time required to complete an ironing or drying operation, or to carry said operation to an end point determined with relation to the amount of residual moisture in the work. Arrival at this desired end point, whether it be complete dryness or any desired deviation therefrom, heretofore has been determined only approximately, based on experience in correlating and estimating the cumulative effect of a number of factors such as the thickness and texture of the materials, the initial total moisture content, the temperature of the pressing or ironing elements, the desired final moisture content, and other factors neither necessary nor feasible to completely tabulate herein. I have provided positive control means preferably of electronic form whereby time intervals may be accurately controlled with relation to the ultimate permissive moisture content, irrespective of any uncertainty as to said variable factors or their cumulative effect.

I have, as part of the present invention, provided an additional control unit which is primarily intended to maintain a predetermined production plan. Articles being processes, which dry prior to the expiration of this predetermined period, remain under the control of the aforesaid moisture sensitive control. Articles of unusual texture or moisture content, which dry at a rate substantially slower than that anticipated, come under the control of the maximum time control tube, and the operation is terminated before such articles are completely dried. The maintenance of a steady production rate more than offsets the disadvantage of an occasional article coming through the production line with some excess of moisture. Incident to this advantage is the fact that this maximum time control unit may prevent damage when other control units fail to operate on schedule.

In the time cycle of operation of a conventional commercial ironing or pressing machine it is also sometimes desirable to prevent any application of pressure during a predetermined period after opening of the press. During this period the finished work may be removed from the press and a fresh unpressed piece may be supplied thereto. As will hereinafter appear, such an enforced delay after opening of the press also allows certain fluid pressure operating mechanisms to evacuate and thereby permit institution of a new cycle. I have therefore supplemented my timing device with means which interposes and controls the duration of a time interval wherein application of pressure is prevented for a definite period between successive operative cycles.

I have also provided adjustable means supplementing my control system whereby the operative critical point of one or more of my control elements may be preset to become effective at any desired point within the usual operating range.

The various electronic control elements may be installed as a simple, portable working unit requiring no particular skill to attach or operate. As will appear in the description hereinbelow a single machine, or a number of machines in tandem, may be equipped with my invention.

An object of the present invention is to provide control means for terminating the ironing, pressing, or drying operation on expiration of a definite predetermined maximum time period after the inception of the operation, if said operation has not previously been terminated by additional control means sensitive to reduction of the moisture content to a predetermined value.

A further object of my invention is to provide means for terminating the pressing operation by one or other of the methods as aforesaid, in combination with additional means for automatically delaying the next pressure application until the expiration of a predetermined period after the press has been opened.

A further object is to provide control elements of the type mentioned, in combination with adjustable means for predetermining the length of the respective periods during which the said elements are in operative control.

Further objects and advantages will be apparent from a consideration of the present specification in conjunction with the attached drawing illustrating an embodiment of my invention as applied to a conventional ironing machine. The drawing is partly diagrammatic and partly schematic and shows, in combination, an electronic control unit energized by tube A which is sensitive to the moisture content of the work, a second electronic control unit energized by tube B which controls the duration of the maximum time period, and, in operational sequence to either tube A or tube B, a third tube C which automatically delays further pressure application for a definite period after the press has been opened by suitable apparatus under the control of either tube A or tube B.

Although in the present specification and the accompanying drawing I describe and illustrate an electronic tube of the three element, separate heater, alternating current type, the elements consisting of the familiar cathode, grid, and plate, it is quite apparent that electron emission tubes of a variety of types may be readily adapted to function in a manner equivalent to that described. The type shown has been chosen for simplicity in illustration and description. Certain gas-filled four-element tubes may be found quite suitable since the passage of space current is facilitated by gas ionization and, in the ionized condition, the space current cut-off point is quite sharp as compared to a somewhat indefinite "twilight zone" encountered in the vacuum type electron tube when the tube is functioning in the neighborhood of critical cut-off bias.

For convenience, and to promote a clearer understanding of the application of the invention to a conventional ironing press I shall first describe the operation of my moisture sensitive control and my maximum time control as used to automatically control the time of opening of the press when the moisture content of the work has been reduced to a predetermined value or when the desired time limit has expired, whichever happens first. Although these control units alone may be used in conjunction with any form of manual or other non-automatic control devices, I prefer to use them as shown in the drawing in conjunction with automatic control means for delaying the next pressure application for any desired period after the press has been opened by one or other of the aforesaid controls. This automatic control for convenience may be termed the press closing control, because it predetermines the requisites for press closing operation.

Although any suitable forms thereof may be employed, for convenience I have shown an electronic relay control. In conjunction with the moisture sensitive control, I have illustrated and will later describe adjustable means for presetting this control to operate at any desired moisture content, and also additional adjustable control means for presetting the pressure producing control to be operable after the lapse of any desired interval within a practical range.

Further, it will be obvious to those skilled in the art that certain of the automatic operations now to be described may be interrupted or augmented by suitable manual controls at certain points in the operating cycle, which manual controls may be substituted for one or more of the more or less automatic controls aforementioned.

*The moisture-sensitive control*

The essential attribute of a moisture-sensitive control for a machine which presses, irons or otherwise dries moisture-containing materials, such as moist fabrics in a laundry, is that some phase of the drying operation shall be controlled with some relation to variation in the moisture content of the work. One operation suitable for such control is the termination of the drying operation, thereby to enable the moisture content of the work to be reduced to a desirable value. This may be accomplished in various ways. For example, opening of the press or termination of the drying operation may be controlled by some device sensitive to the diminishing weight of the moisture-containing work. Such an arrangement might be entirely mechanical. In the arrangements shown in the drawing, however, I make some part or phase of the drying operation, such as the time of termination thereof, sensitive to variation in current flow through the work as the result of reduction of its moisture content and the consequent increase in its electrical resistance, although not limited thereto, and that arrangement will now be described in detail.

The drawing illustrates an ironing press equipped with an electronic tube A, said tube having associated therewith the conventional plate and grid circuits later discussed in some detail. The moisture content of the article being ironed or pressed is employed to affect the grid bias of the tube, so that when the article reaches a desired end point as determined by its residual moisture content, the grid bias passes beyond a critical point in its effect upon the plate circuit, generally termed the space current cut-off point, and the plate circuit thereupon operates a relay to cause the press to open. This can be accomplished either by energization or by de-energization of the relay.

In application to the embodiment herein shown, which is intended to be illustrative merely and not limiting, when the press is open and the ironing operation is ready to begin, the tube A is in normal operating condition and the grid is biased in the usual manner to pass sufficient current to maintain a relay in closed condition. When the press is closed on a wet article, the moist material, being a partial conductor of electricity, serves as a circuit closer to superimpose additional potential upon the grid, as will appear, so as to overbias the grid and block the flow of plate current, thereby permitting the aforesaid relay to open. When the article dries to a certain predetermined critical value of moisture, the material ceases to conduct sufficient current, and the grid potential is restored to normal operating bias, and the tube once more passes sufficient plate current to close the relay. As will hereinafter appear, the fluid pressure operating mechanism thereupon automatically opens the press.

To illustrate the use of the controls embodying my invention, I have schematically shown a fairly conventional ironing press equipped with an electronic control system. The press shown may be operated or controlled individually or may be one of an assembly of two or more presses coupled for tandem or related control, in the usual manner. The drawing shows a press equipped for tandem operation.

The press shown comprises a suitable frame 1, on which is mounted for vertical movement a padded work supporting bed 2 actuated through a pivoted lever 3 by a suitable pressure producing servomotor 4 operated by fluid pressure, such as air pressure.

Cooperating with the bed is a smooth-surfaced metal pressing head 5 suitably mounted for movement toward and from the bed, such as by being supported upon one arm of a pivoted head lever 6. Either the head or the bed, or both thereof, may be heated, as by steam circulated through the usual heating chambers thereof by the pipes 2a, 5a. The head is operated by a press-closing servomotor 7, the piston rod of which is connected to the usual toggles 8, the head lever being also sensitive to the usual head opening springs 9; 10 indicates a yielding shock absorber, limiting motion of the toggle members, during press closing movement, to a position slightly beyond dead center, and serving to kick the toggles back across dead center to initiate press opening movement.

11 is a normally closed valve in the fluid pressure supply line to the servomotor 4, said valve being opened by a lever 12 actuated by the toggles 8 when the head reaches closed position.

The press is controlled by the usual manuals, including two combination inlet and exhaust valves in series, marked respectively 13, 14, actuated by manuals 13a, 14a and controlling the flow of fluid pressure from the supply line 15 to and the exhaust from the press closing servomotor 7.

When the press has been closed, and the head is in pressing relation with the bed, powerful pressure is produced between the pressing members by the servomotor 4, pressure flowing to it from the supply line 15 by way of valve 11 and the usual release or press opening valve 16. Said release valve may be operated either manually, by the usual manual 16a, operation of which evacuates the servomotor 4 and enables the shock absorber 10 and springs 9 to open the press, or automatically by the servomotor 17.

Said servomotor 17 is the one usually employed for tandem control, by coupling its supply line 18 to the tandem valve 19 of a neighboring press, valve 19 being operated by the usual manual 19a.

The press operating and control parts so far described are all of usual form and well known and require no further description.

According to the present invention I supplement the press operating and control parts so far described by means associated with the press mechanism and control parts at two points, to-wit:

(a) One electric circuit, sensitive to variations in the moisture content of the work being pressed, is operatively associated with the pressing members.

A further electrical circuit, also operatively associated with the pressing members, is energized by initial closing of said members, and (b) Both said electrical circuits are so arranged as to be singly capable of producing a controlling effect, as by an electro-magnetic coil 23, upon a normally closed fluid pressure supply valve 20 connected by the pipe 21 to the fluid pressure source 15, and controlling the flow of pressure by way of pipe 22 to the pipe 18, supplying pressure to the servomotor 17.

18a and 22a respectively represent check valves, seating away from the servo motor 17 in the pipes 18 and 22, and preventing back flow therethrough.

Buck 2 carries thereon a sheet of wire gauze which may have any suitable area, but is shown as substantially coextensive with the working area of the buck. This gauze is insulated from the buck by the usual pad 38 and is conductively electrically connected to wire 60. On top of the wire gauze is the usual muslin layer 39. When a moist article is placed on the buck and the head and buck are pressed together, the muslin layer absorbs sufficient moisture from the article to permit electric current to pass from wire 59 to the machine frame and the metal of the head 5 to the wire gauze 37 as part of a grid circuit to be described hereinbelow.

I have diagrammatically shown, in triplicate, for simplicity in illustrating and describing the cooperating circuits, transformers 41, 41a, and 41b. It should be understood, however, that in practice a single transformer serves the triple function here illustrated. Line voltage of the alternating current type is supplied at $L_1$ and $L_2$ for the primary winding. Tube A is a standard three-element alternating current electronic tube of the separate heater type; the leads H—H of heating filament 43 are supplied with current from leads H—H of secondary winding 44 of transformer 41 so as to heat cathode 45 to the electron emission range. The circuit for the plate 46 is supplied with current from secondary winding 47 of the transformer 41, and includes conductor 48, relay 49, and conductor 50. When relay coil 49 is energized by a plate current of sufficient strength it draws armature 51 into engagement with contact point 52 against the action of a spring (not shown) or against gravity so as to break contact with point 53, thereby affecting further circuits as later described.

Grid 54 of tube A is biased with respect to the cathode 45 and terminal 55 of the plate circuit by means of a standard voltage drop grid bias resistor 56 and I have provided for the grid circuit an additional variable resistor 57 which supplements the effect of resistor 56 with respect to its biasing characteristics so that by adjustment of resistor 57 the space current cut-off point of the tube may be varied over a range depending on the operating characteristics of the tube, and the voltage drop of resistor 56 and the active portion of resistor 57.

A supplementary grid bias may be imposed on the grid by means of secondary winding 58, conductor 59, press head 40, wire gauze 37, conductor 60 and resistor 56 when the press is closed and the circuit described above is completed through the wet article. The potential developing from this circuit and originating at secondary 58 is sufficient to definitely unbalance the grid bias to cut-off position, the plate current is interrupted, and armature 51 of relay 49 moves into contact with point 53. If the maximum time control, later to be described, does not first intervene, this condition is maintained until the article dries to the point where the grid current in the supplementary grid circuit drops past grid cut-off value, at which time the supplementary grid circuit is interrupted, the tube passes plate current normally (as prearranged by the setting of resistor 57), the relay 49 is energized, and the armature 51 returns to contact with point 52.

It is apparent to those skilled in the art that the cut-off point in the valving effect of tube A is adjustable by resistor 57 so that the over-biasing characteristics of the supplementary grid circuit will terminate at any desired moisture content of the work, in acordance with a predetermined plan. A few trials will be sufficient to teach the operator the proper setting of the variable resistor 57 for any desired moisture end point at which plate current will again energize the relay, or the resistor may be calibrated and a suitable scale and indicator may be provided therefor.

The device so far described may be utilized to perform any desirable operation of the ironing device, such as, for example, the opening of the press, when plate current again begins to flow, through the medium of any desired circuit associated with relay 49, which may be directly effective upon the magnet coil 23. I prefer, however, to use the moisture sensitive electronic control just described in conjunction with an additional time delay relay which operates automatically to prevent another application of pressure pending the lapse of a predetermined period after the press has been opened, as will later be described.

The maximum time control

When the grid of tube A is unbalanced so as to cut off space current to the plate, as a result of the closing of the press, it produces, simultaneously, changes in certain characteristics of tubes B and C. The relay 49, energized by plate current in tube A, operates a double contactor having movable armatures 51, previously described, and 71. When plate current is flowing in tube A armatures 51 and 71 make contact, respectively, at 52 and 72, and when the grid 54 of tube A at is cut-off bias the said armatures 51 and 71 make contact, respectively, at 53 and 73. Before the press is closed, and while armature 71 is in contact with point 72 as aforesaid, no plate current is flowing in tube B for the following reason.

The filament 74 of tube B is heated by current from secondary winding 75 of transformer 41a and said filament heats cathode 76 to electron emission temperature. Ordinarily, when armature 71 is in contact at point 72, an over-biasing potential is impressed on the grid 77 of tube B through the following circuit; from the secondary 78 of transformer 41a through conductor 79, point 72, armature 71, conductor 80, and, in parallel, condenser 81 and variable resistor 82, resistor 83 to grid 77. The excess grid potential of tube B originating at secondary winding 78 is sufficient to unbalance the grid potential of tube B to the point where no plate current flows in the tube. The relay 84 which, when the tube is passing plate current, is energized by current from secondary winding 85 of transformer 41a through conductor 86, relay 84, conductor 87, and plate 89, is therefore de-energized when plate current is interrupted in the tube as aforesaid, and armature 90 breaks contact with point 91 and makes contact at point 92.

As is well known to those skilled in the art, the passage of current from a heated cathode to a colder plate or grid is unidirectional, and only half of the alternating current wave originating at 78 traverses the supplementary grid circuit explained above, the tube operating as a rectifier with regard to said grid circuit (and, of course, said plate circuit), and while said circuit originating at 78 is so energized the condenser 81 accumulates a charge by reason of the unidirectional flow, the magnitude of which charge depends on the capacity of the condenser. When, ultimately, the supplementary grid circuit is broken at 72 by de-energization of relay coil 49, tube B will not immediately function normally in passing plate current because condenser 81 begins to discharge into the original grid circuit the accumulated potential built up during operation of the supplementary circuit. The period of this discharge is determined by a number of factors involving the resistance, inductance, and capacity of the circuit, but in the absence of variable resistor 82 the discharge period would be of very short duration. By introducing this adjustable high resistance element 82 into the circuit the condenser discharge may be delayed over a period of as much as several minutes and, for my purpose, the significant effect is that the discharge unbalances the grid bias sufficiently to block passage of plate current until the condenser 81 has returned practically to neutral condition. In normal operation, when tube B is passing plate current, resistor 82 and condenser 81 are shorted out of the grid circuit by the position of armature 71 in contact with point 73.

By thus utilizing the functional characteristics of tube B to charge condenser 81 during the operation of the supplementary grid circuit and thereafter discharge it, I have succeeded in securing a simple, effective, and adjustable control of a maximum time interval which began when the press closed on the moist article, and which ends when condenser 81 is discharged. The function of tube C in cooperating with tubes A and B both in the opening of the press, and in thereafter preventing its subsequent closing for a definite period will now be described.

As in the case of tubes A and B, tube C is illustrated as a standard three-element, separate heater, alternating current tube. Its filament 101 is energized from secondary winding 102 of transformer 41b and heats cathode 103 to the electron emission temperature. Normally, that is to say when the press is not closed upon a moist article, tube C is passing space current to plate 104, the plate current originating at winding 105 of transformer 41b and flowing through conductor 106, relay 107, and conductor 108. The grid 110 of tube C is biased with regard to plate terminal 112 by a voltage drop resistor 111. While the tube is thus passing plate current in normal operation, armature 113 makes contact at point 114 by reason of the energization of relay 107. When the press head is closed upon a moist article as hereinabove described, and when the plate current of tube A is thereupon interrupted so as to cause armature 51 to make contact at point 53, a supplementary grid circuit is superimposed upon the grid 110 of tube C in the following manner. A potential originating at 115 of transformer 41b is carried through conductor 116, point 92, armature 90, conductor 117, conductor 118, armature 51, point 53, conductor 119 and, in parallel, variable resistor 120 and condenser 121, to the grid 110 of tube C. As in the case of tube B already described, this potential is sufficient to unbalance the grid bias of tube C to the point where it blocks the normal space current to plate 104 thereby de-energizing relay 107 and permitting armature 113 to drop to point 122. Also, since tube C is acting as a rectifier of the potential originating at 115 of transformer 41b the condenser 121 is being charged with a potential which will later be discharged into the grid circuit as will appear.

From the point where plate current in tube A was blocked by the over-bias of grid 54 when the press head was closed on a moist article, tube A and tube B are simultaneously in control and, if the maximum time, as determined arbitrarily in advance, elapses before the article is dried to the desired point, tube B will cause the press to open at the end of said maximum time. On the other hand, if, as is usually expected, the work dries to the proper point before the expiration of said maximum time, tube A will cause the press to open.

The sequence of operations will first be described on the assumption that the maximum time limit expires before the press is otherwise opened; I will subsequentlly described the sequence of operations which occur when the desired moisture content is reached before the expiration of the maximum time limit.

*Press opening by maximum time control tube*

It will be recalled that when tube A was blocked as aforesaid and armature 71 broke contact at 72, condenser 81 began to discharge its excess acquired potential into the grid circuit of tube B. At the end of the preset period, as determined by the setting of variable resistor 82, the grid potential of tube B drops to the point where it permits normal passage of plate current to plate 89 and at this moment relay 84 is energized and armature 90 makes contact at point 91. The line circuit is now closed to solenoid 23 in the following manner: from $L_1$ through conductor 126, windings of solenoid 23, conductor 127, point 122, armature 113, conductor 128, conductor 117, armature 90, point 91, conductor 129, conductor 130 to $L_2$.

The energization of solenoid 23 causes the press to open as previously described by causing motor 4 to be opened to exhaust through the instrumentality of valve 16 under the operative influence of servomotor 17 which is supplied with pressure from valve 20 operated by solenoid 23. It is obvious that while solenoid 23 is thus energized, the servomotor 4 remains in exhaust position and no pressure can be applied by means of buck 2.

I have described the operation as it takes place when the maximum time control tube functions prior to the termination of the ironing operation as controlled by the moisture-sensitive tube A. As mentioned above, this control by tube B may take place because, for some reason, tube A has not functioned as it was intended to, or, perhaps because the article in the press has not dried at approximately the expected speed. In normal operation the tube B is intended to insure maintenance of a production schedule and the opening of the press is usually controlled by the operation of tube A in the following manner.

*Press opening by moisture control tube*

Assuming that the press has been closed upon the moist article and plate current has been interrupted in tube A in the manner already described, the relay 49 has been de-energized and armature 51 is in contact with point 53, and the circuit to solenoid 23 is open at points 52 and 91. When the ironing operation is completed, as evidenced by the article arriving at such a moisture content as to break the supplementary grid circuit of tube A, the tube A returns to normal operation, and plate current energizes relay 49, whereupon armature 51 makes contact at point 52. The circuit to solenoid 23 is now closed in the following manner. From $L_1$ through conductor 126, windings of solenoid 23, conductor 127, point 122, armature 113, conductor 128, conductor 118, armature 51, point 52, conductor 130 to $L_2$. The energization of the solenoid permits the press to open as heretofore described with relation to the operation of tube B.

*Electronic control of next pressure application*

While solenoid 23 is energized, servomotor 4 is open to exhaust through valve 16 so that application of pressure by means of buck 2 is prevented. The purpose of control tube C and its associated circuits is to maintain solenoid 23 in energized condition, whereby servomotor 4 remains open to exhaust for a predetermined and controlled interval, during which interval pressure may not be applied to the press. In brief, and before describing this additional feature in detail, I have provided means for controlling the operating characteristics of tube C, so that when the press is opened either through the instrumentality of tube A or tube B, tube C will assume temporary control and prevent the closing of the press during the period of said temporary control. The device operates as follows:

When the supplementary grid circuit described hereinabove for tube C is broken at point 53 by the re-energization of relay 49, which causes the press to open, condenser 121 begins to discharge its accumulated potential on the grid 110 of tube C in a manner similar to that already described above for the discharge of condenser 81 on the grid of tube B. The period required for this discharge is regulated by the setting of variable resistor 120. As soon as the condenser 121 is substantially completely discharged tube C returns to normal operation and begins to pass plate current, thereby energizing relay 107 so as to cause armature 113 to break contact at point 122 and make contact at 114. As soon as the armature breaks the contact at the point 122 the circuit to solenoid 23 is terminated, and as a consequence motor 4 is closed to exhaust. The press may thereafter be again closed by manuals 13a and 14a as previously described.

It is apparent from the foregoing description that I have provided control means applicable to apparatus for drying moist fabrics, as exemplified for instance by an ironing or drying press wherein the work is pressed between relatively movable members. The drying apparatus has operating means controlled by a device which is sensitive to the moisture content of the work, and which effects the termination of the press drying operation when the predetermined critical moisture content is reached. As an example of such a moisture-sensitive control device I have described an electronic tube and associated circuits having suitable operative devices energized thereby. This moisture-sensitive control is disclosed and claimed in my aforesaid copending application.

An important function of this moisture-sensitive control is to open a press as described, but I have adapted said control to be used in combination with further control means for opening said press at the expiration of a fixed period after it has been closed, regardless of the moisture content of the work and regardless of whether the ironing operation has been, in some instances, completed. This control I have termed the maximum time control.

The foregoing controls may be readily adapted to be used in combination with control means for preventing further application of pressure for a predetermined period, which means I refer to, for convenience, by the term "press closing control." In preferred form this is a unit based on an electronic tube and associated circuits, although an electro-magnetic relay operatively associated with a mechanical timing device, such as shown in my aforesaid copending application, could readily be adapted to this purpose.

I have illustrated and described adjustable means for varying the sensitivity of the moisture-sensitive control device so as to render it capable of reacting to terminate a time cycle at any predetermined amount of residual moisture. I have further provided convenient adjustable means applicable to the described maximum time control and the press closing control whereby the length of respective time cycles determined thereby are under the control of the operator and may be preset to take place automatically. As an example of this adjustable control I have shown a condenser which is charged by a supplementary grid circuit in one period of a time cycle, and which thereafter controls a subsequent period of the time cycle by a restrained discharge when the supplementary grid circuit is broken.

The embodiments disclosed are exemplary of the inventive concept, and are presented for illustration and not limitation.

What I claim is:

1. Apparatus for drying moist fabrics, comprising relatively movable pressing members between which the work may be pressed, operating means for causing relative movement of said members toward and from each other for the pressing operation, means for evaporating moisture in the fabric between said members when they are in pressing relation, control means sensitive to the moisture content of the work for separating said members to thereby terminate the pressing operation, additional control means for causing said members to separate at a predetermined period after they have been moved relatively into pressing relationship as aforesaid, whereby said pressing operation is terminated by said additional control means if it has not previously been otherwise terminated, and further control means for preventing further pressure contact between said members for a preterminated period after their separation.

2. Apparatus for drying moist fabrics, comprising relatively movable pressing members between which the work may be pressed, operating means for causing relative movement of said members toward and from each other for the pressing operation, means for evaporating moisture in the fabric between said pressing members when they are in pressing relation, control means for said operating means comprising an electronic tube having a grid circuit arranged to conductively include the work when under pressure and thereby being sensitive to the moisture content of the work and having a plate circuit effectively associated with said operating means for separating said members to thereby terminate the pressing operation, and additional control means comprising a second electronic tube having its grid circuit operatively associated with said first named control means and its plate circuit effectively associated with said operating means for causing said members to separate at a predetermined period after said first named control means has initiated relative movement of said members into pressing relationship as aforesaid, whereby said pressing operation is terminated by said additional control means if it has not previously been otherwise terminated, and further control means for said pressing members, comprising a third electronic tube having its grid circuit operatively associated with said first and second electronic tubes for control thereby and its plate circuit operatively associated with said operating means for preventing further pressure contact between said members for a predetermined period after their separation.

3. Apparatus for drying moist fabrics, comprising relatively movable pressing members between which the work may be pressed, operating means for producing relative movement of said members toward and from each other for the pressing operation, at least one of said members being heated, said operating means including a first electronic tube, the aforesaid movable pressing members constituting cooperating electrodes in a grid circuit for said tube, said grid circuit being thereby sensitive to the moisture content of the work interposed between said pressing members, means in a plate circuit of said first tube and operatively associated with said pressing members for separating them, said operating means further including a second electronic tube and means whereby it is energized upon operative contact of said pressing members with a moist article, said second electronic tube being provided with means to cause said movable pressing members to separate upon the expiration of a predetermined period after said operative contact, whereby said pressing operation is terminated by said second electronic tube if it has not previously been otherwise terminated, said operating means further including a third electronic tube operatively associated with at least one of said first and second electronic tubes to be sensitive to space current variations therein, and means energized by said third electronic tube for preventing reengagement of said pressing members for a predetermined time after said pressing members have been separated.

JOHN E. PRESTON.